Dec. 29, 1925.   1,567,604
R. KIRCHHOFF
RECTUM TUBE
Filed June 29, 1920

INVENTOR:

Patented Dec. 29, 1925.

1,567,604

UNITED STATES PATENT OFFICE.

RICHARD KIRCHHOFF, OF STUTTGART, GERMANY.

RECTUM TUBE.

Application filed June 29, 1920. Serial No. 392,841.

*To all whom it may concern:*

Be it known that I, RICHARD KIRCHHOFF, a citizen of the German Empire, residing at Stuttgart, Germany, have invented certain new and useful Improvements in Rectum Tubes (for which I have made application in Germany, August 12, 1918; Italy, January 8, 1920; France, November 27, 1919; Spain, December 10, 1919; England, December 4, 1919), of which the following is a specification.

My invention relates to a small pipe adapted to be inserted in the rectum and having enlargements preventing its slipping in too far and dropping out, and it consists substantially in one or more apertures being provided on or near the outer as well as the inner enlargement.

It serves for the continuous removal of gas from the intestines. In order to prevent the unpleasant odour of these gases from being noticeable, substances which counteract such odours may be inserted in the interior of the pipe.

The invention is illustrated in the accompanying drawings in three modifications, to which reference will now be made.

Figure 1:
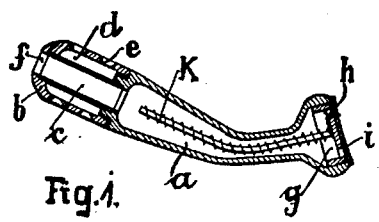
Fig. 1 is a longitudinal section of a pipe provided with a salve holder at the inner end and a soft, elastic closing plate at the outer end.

Referring to Fig. 1, $a$ is a pipe which is curved, and rounded off in such a way that it may be worn without inconvenience and will not be stopped at the inner end by mucus. It is enlarged in a wedge form towards the end which it is to be inserted and at the outer end is thickened to a button shape. A hollow cap $b$ is screwed on the pipe $a$ and a tube $c$ is secured in the said cap $b$. In the space $d$ left between this tube and the cap chamber, salves may be inserted for treating any internal hæmorrhoids. The heat of the body liquefies the ointments or salves which then gradually escape through the apertures $e$ into the bowel. The bowel gases may enter the tube $c$ through the aperture $f$ and flow lengthwise through the pipe $a$. At the outer end of the pipe $a$, a cap provided with apertures $h$ in its cover, is inserted and the gases escape through these apertures and penetrate inaudibly between the somewhat closely fitting edges of the soft, elastic closing plate $i$, for instance made of indiarubber, which is attached to the cap or cover $g$. A twisted wire wrapped with absorbent thread in brush fashion is attached to the cover $g$ and may be immersed in scented substances. Other deodorant substances may however be employed.

Figure 2:
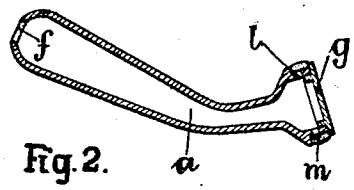
Fig. 2 is a longitudinal section of a pipe with a soft elastic closing ring.

In the modification shown in Fig. 2, the cap $b$ is dispensed with. The pipe $a$ which is closed at the outer end by an inserted cap or cover $g$, has lateral gas outlets $l$ which are covered by a soft elastic ring $m$. Felt or wadding, saturated with scented or the like substances may be inserted in the cap $g$.

Figure 3:
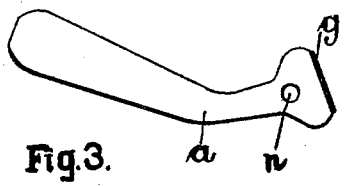
Fig. 3 is an external view of a pipe with lateral gas exit apertures.

In the modification shown in Fig. 3, the pipe $a$ which is of similar shape to the one illustrated in Fig. 2 is again closed at the outer end by an inserted cap or cover $g$. The ring $m$ is however dispensed with. The gases escape through one or more apertures $n$ and then between the outer enlargement of the pipe and the skin. In consequence of the action of the contracting muscle which constantly tends to draw the pipe inwards this enlargement is always pressed against the skin.

On the passage of the gas through the pipe illustrated in Fig. 3, the pressure of the gas forces the tapering pipe so far outwardly until sufficient interval for the passage of the gas between the outer enlargement of the pipe and skin is available for which a few fractions of a millimetre suffice.

In consequence of the wedge action which is thereby caused the contacting or closing muscle only needs to be further expanded to a part of these fractions of a millimetre and because the smallest gas pressure already suffices for this, the accumulation of gas and the overstraining and weakening of the intestinal muscles which thereby results, is no longer possible.

I claim:

1. A rectum tube comprising in combination, a tubular middle portion, a tube adjoining one end of and communicating with said middle portion, said tube being inclined at an angle relatively to said middle portion and increasing in diameter outwardly and a bulb at the other end of said middle portion having a lateral opening.

2. A rectum tube comprising in combination, a tubular middle portion, a tube adjoining one end of and communicating with said middle portion, said tube being inclined at an angle relatively to said middle portion and increasing in diameter outwardly, a bulb at the other end of said middle portion having a lateral opening and means for closing said bulb.

In testimony whereof I affix my signature.

RICHARD KIRCHHOFF.